United States Patent [19]
Hobbs

[11] Patent Number: 5,815,572
[45] Date of Patent: Sep. 29, 1998

[54] VIDEO SCRAMBLING

[75] Inventor: Gary Lamont Hobbs, Indianapolis, Ind.

[73] Assignee: Lucent Technologies Inc., Murray Hill, N.J.

[21] Appl. No.: 522,624

[22] Filed: Aug. 31, 1995

[51] Int. Cl.⁶ .................................................. H04N 7/167
[52] U.S. Cl. ................................ 380/10; 380/14; 380/17; 380/49
[58] Field of Search .................................. 380/9, 10, 14, 380/17, 20, 49, 50, 59

[56] References Cited

U.S. PATENT DOCUMENTS

| | | | |
|---|---|---|---|
| 4,245,245 | 1/1981 | Matsumoto et al. | 380/20 X |
| 4,563,702 | 1/1986 | Heller et al. | 380/10 |
| 4,827,510 | 5/1989 | Walker et al. | 380/14 |
| 4,916,737 | 4/1990 | Chomet et al. | 380/20 |
| 4,964,162 | 10/1990 | McAdam et al. | 380/14 |
| 5,185,794 | 2/1993 | Thompson et al. | 380/17 |
| 5,268,961 | 12/1993 | Ng | 380/17 X |
| 5,321,748 | 6/1994 | Zeidler et al. | 380/14 |

*Primary Examiner*—Bernarr E. Gregory
*Attorney, Agent, or Firm*—David L. Smith

[57] ABSTRACT

A system for scrambling a video signal, wherein multiple modes of scrambling are available, including (i) line reversal, (ii) line inversion, (iii) line permutation, and (iv) block permutation. The invention changes the combination of modes used as time progresses. In addition, particular modes can be implemented, or suppressed, in response to such factors as (i) noise in the transmission channel and (ii) amount of motion within the video image.

10 Claims, 9 Drawing Sheets

FIG. 9

| LINE PERMUTATION TABLE 1 | |
|---|---|
| RECEIVED LINE | ACTUAL POSITION |
| 1 | 1 |
| 2 | 2 |
| 3 | 3 |
| 4 | 4 |
| 5 | 5 |

| LINE REVERSAL TABLE 1 |
|---|
| REVERSED? |
| 0 |
| 0 |
| 0 |
| 0 |

| LINE INVERSION TABLE 1 |
|---|
| INVERTED? |
| 0 |
| 0 |
| 0 |
| 0 |

| BLOCK PERMUTATION TABLE 1 | |
|---|---|
| RECEIVED BLOCK | ACTUAL POSITION |
| 1 | 1 |
| 2 | 2 |
| 3 | 3 |
| 4 | 4 |
| 20 | 20 |

| LINE PERMUTATION TABLE 2 | |
|---|---|
| RECEIVED LINE | ACTUAL POSITION |
| 1 | 5 |
| 2 | 1 |
| 3 | 2 |
| 4 | 3 |
| 5 | 4 |

| LINE REVERSAL TABLE 2 |
|---|
| REVERSED? |
| 0 |
| 0 |
| 0 |
| 1 |

| LINE INVERSION TABLE 2 |
|---|
| INVERTED? |
| 0 |
| 0 |
| 0 |
| 1 |

| BLOCK PERMUTATION TABLE 2 | |
|---|---|
| RECEIVED BLOCK | ACTUAL POSITION |
| 1 | 20 |
| 2 | 1 |
| 3 | 2 |
| 4 | 3 |
| 20 | 19 |

| LINE PERMUTATION TABLE 3 | |
|---|---|
| RECEIVED LINE | ACTUAL POSITION |
| 1 | 4 |
| 2 | 5 |
| 3 | 1 |
| 4 | 2 |
| 5 | 3 |

| LINE REVERSAL TABLE 3 |
|---|
| REVERSED? |
| 0 |
| 0 |
| 1 |
| 0 |

| LINE INVERSION TABLE 3 |
|---|
| INVERTED? |
| 0 |
| 0 |
| 1 |
| 0 |

| BLOCK PERMUTATION TABLE 3 | |
|---|---|
| RECEIVED BLOCK | ACTUAL POSITION |
| 1 | 19 |
| 2 | 20 |
| 3 | 1 |
| 4 | 2 |
| 20 | 18 |

| LINE PERMUTATION TABLE 4 | |
|---|---|
| RECEIVED LINE | ACTUAL POSITION |
| 1 | 3 |
| 2 | 4 |
| 3 | 5 |
| 4 | 1 |
| 5 | 2 |

| LINE REVERSAL TABLE 4 |
|---|
| REVERSED? |
| 0 |
| 0 |
| 1 |
| 1 |

| LINE INVERSION TABLE 4 |
|---|
| INVERTED? |
| 0 |
| 0 |
| 1 |
| 1 |

| BLOCK PERMUTATION TABLE 4 | |
|---|---|
| RECEIVED BLOCK | ACTUAL POSITION |
| 1 | 18 |
| 2 | 19 |
| 3 | 20 |
| 4 | 1 |
| 20 | 17 |

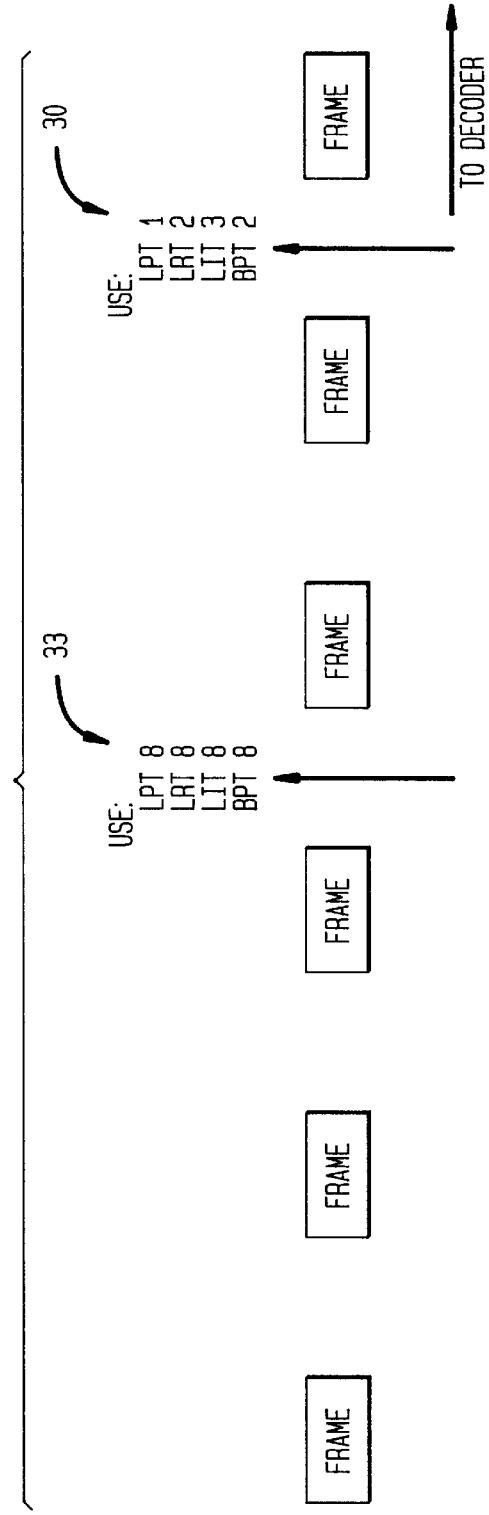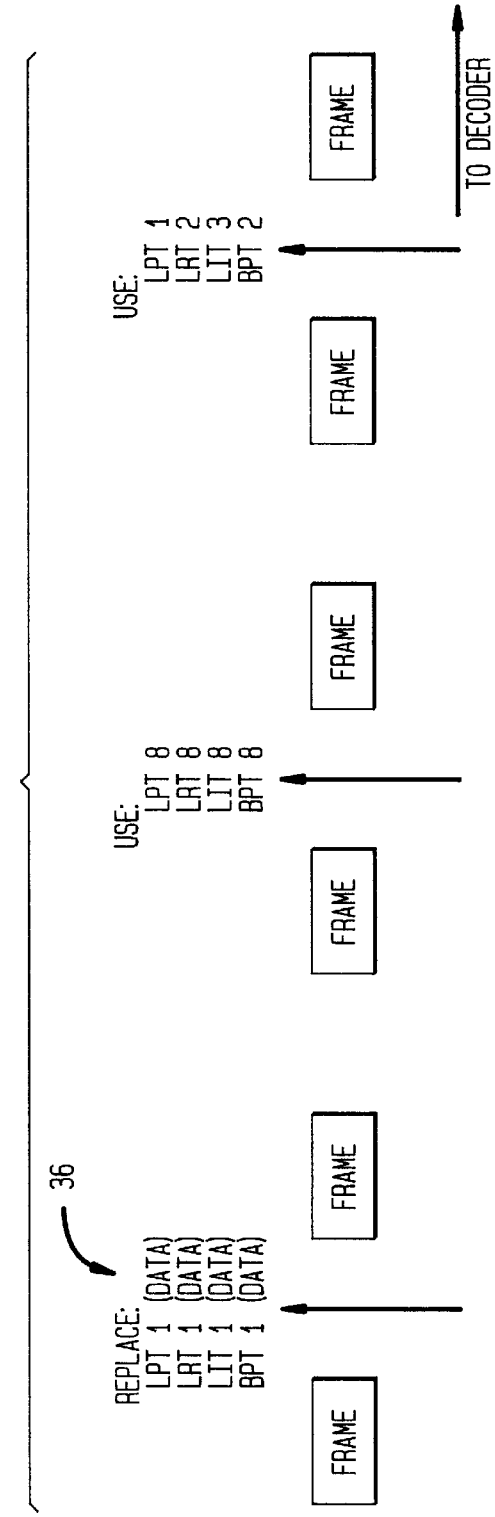

VIDEO SCRAMBLING

The invention concerns scrambling of video signals, such as those used in cable television, for security purposes.

BACKGROUND OF THE INVENTION

Services exist which transmit television signals on various channels, such as satellite links and cable television networks. The services frequently scramble the signals, in order to prevent unauthorized parties from gaining access to the signals.

However, experienced "hackers" can frequently crack the scrambling code, and defeat the purpose of the scrambling. More complex scrambling techniques can make cracking more difficult, but are, in general, more expensive to implement.

SUMMARY OF THE INVENTION

According to the present invention, an improved video scrambling system, which is simple to implement, but difficult to crack, is provided.

In one form of the invention, multiple modes of video scrambling are available to a scrambler, including (i) line inversion, (ii) line reversal, (iii) line permutation, and (iv) block permutation. The invention changes the combination of modes used during operation.

In another form of the invention, the combination of scrambling modes used is changed during operation, based on (i) amount of noise in the transmission channel, and (ii) amount of motion contained in the video image scrambled.

In another form of the invention, decoding of the scrambled image is done by using tables, which are somewhat analogous to encryption "keys" used in de-crypting encrypted data. The scrambling codes are changed during operation, requiring the tables used be changed also. In addition, in one type of change, the contents of the tables are changed during operation, by downloading new data.

BRIEF DESCRIPTION OF THE DRAWINGS

The features and advantages of the present invention will be more readily understood from the following detailed description when read in conjunction with the accompanying drawings in which:

FIG. 9 illustrates, by four examples, the large number of combinations of scrambling possible under the invention;

FIG. 11 illustrates commands which are issued, to order a DECODER to change the tables being used;

FIG. 12 illustrates commands ordering the DECODER to change tables being used, and, in addition, commands which change data contained within tables themselves.

DETAILED DESCRIPTION OF THE INVENTION

Figure 1:
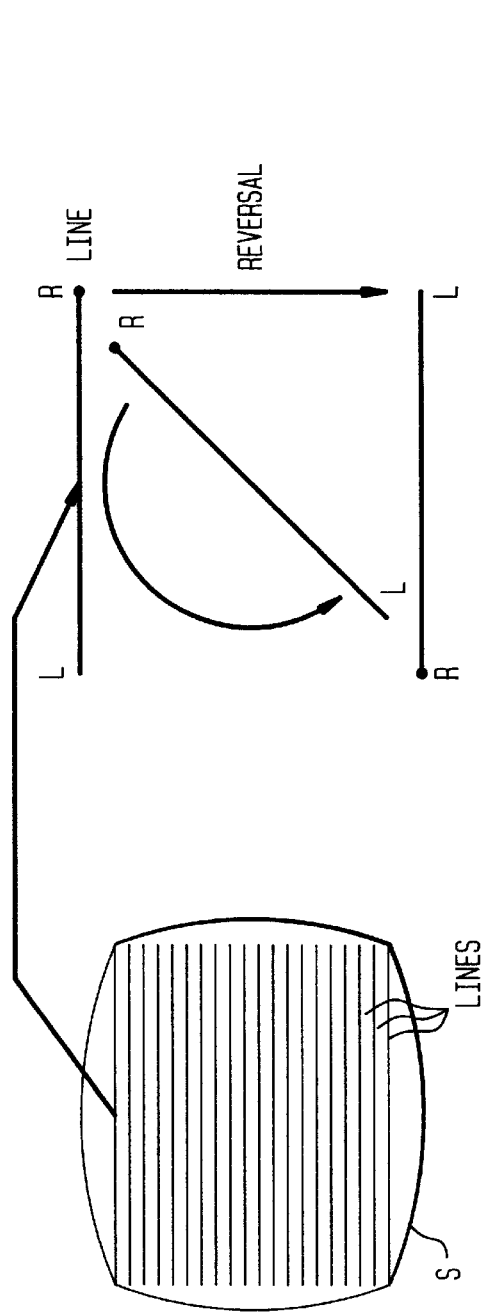
FIG. 1 illustrates line reversal of a video signal.

FIG. 1 illustrates a television screen S, showing 20 scanning LINEs. FIG. 1 is, of course, a simplification, in that television images typically contain far more than twenty lines. For example, in the United States, under one convention of the NTSC (National Television Standards Committee), a typical screen contains 525 scanning lines, not twenty.

Returning to the simplification, and with specific reference to FIGS. 1–5, four types of scrambling of these LINEs will be explained, namely, (1) line reversal, (2) line permutation, (3) line inversion, and (4) block permutation.

Line Reversal

FIG. 1 depicts line reversal, which involves flipping a line, end-for-end. Right (R) becomes left (L), and left becomes right, as indicated. The dots indicate the original right side of each line, for reference in later Figures.

Since the lines are represented by digital data, line reversal involves reversing the order of transmission of the data.

Line Permutation

Figure 2:
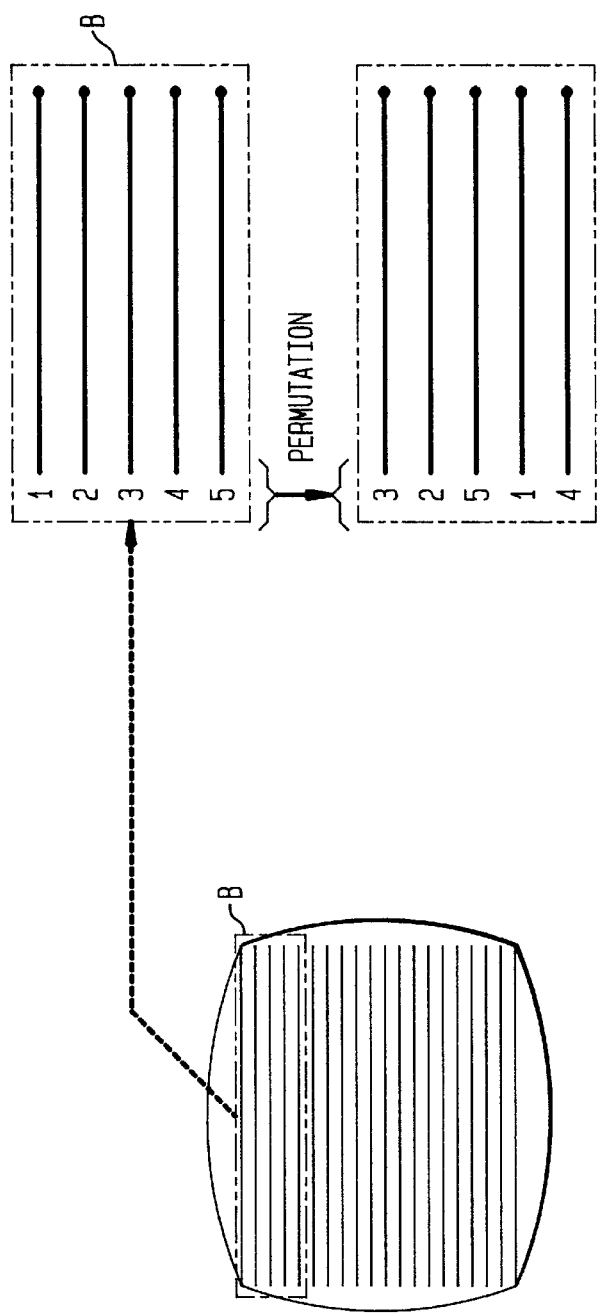
FIG. 2 illustrates permutation of lines in a video signal.

Line permutation is represented in FIG. 2. The lines are collected into groups, or blocks B. Each block contains five lines. (The parameter five is chosen for simplicity of explanation. The invention is not restricted to five lines per block. In one mode of operation, the invention can handle 32 lines per block.) In permutation, the ordering of the lines is changed, or permuted, within each block. For example, in FIG. 2, the normal order (1, 2, 3, etc.) is permuted into the order (3, 2, 5, 1, 4). The lines are transmitted in this permuted order.

Line Inversion

Figure 3:
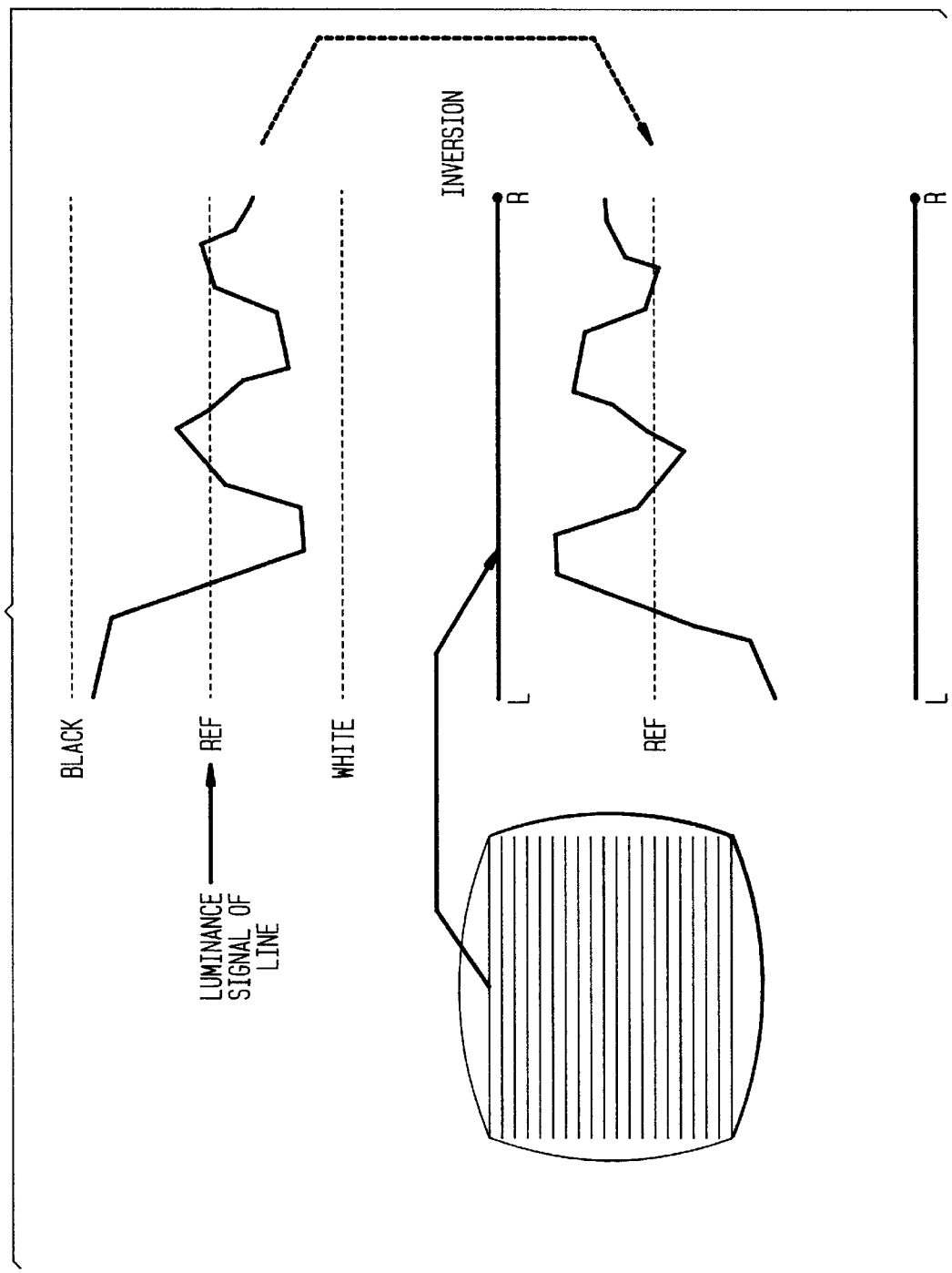
FIG. 3 illustrates inversion of lines in a video signal.

FIG. 3 shows line inversion. Each LINE is generated by a luminance signal 10. The higher values of the luminance signal represent BLACK levels, as indicated, and the lower values indicate WHITE levels. Intermediate levels range from light grey to dark grey.

Inversion involves changing black to white, and white to black. (Conceptually, inversion resembles converting a photograph into a negative of the photograph.) Inversion can be viewed as generating a mirror-image of the luminance signal about a reference REF, as indicated in the Figure.

In the digital domain, inversion can be accomplished by subtracting each point of the luminance signal from the reference value REF, and multiplying the result by a negative number. In addition, another number can be added, in order to level-shift the result.

In the analog domain, inversion can be accomplished by running the luminance signal through an inverting operational amplifier. Such an amplifier has a negative gain.

Digital and analog inversion are known in the art.

Block Permutation

Figure 4:
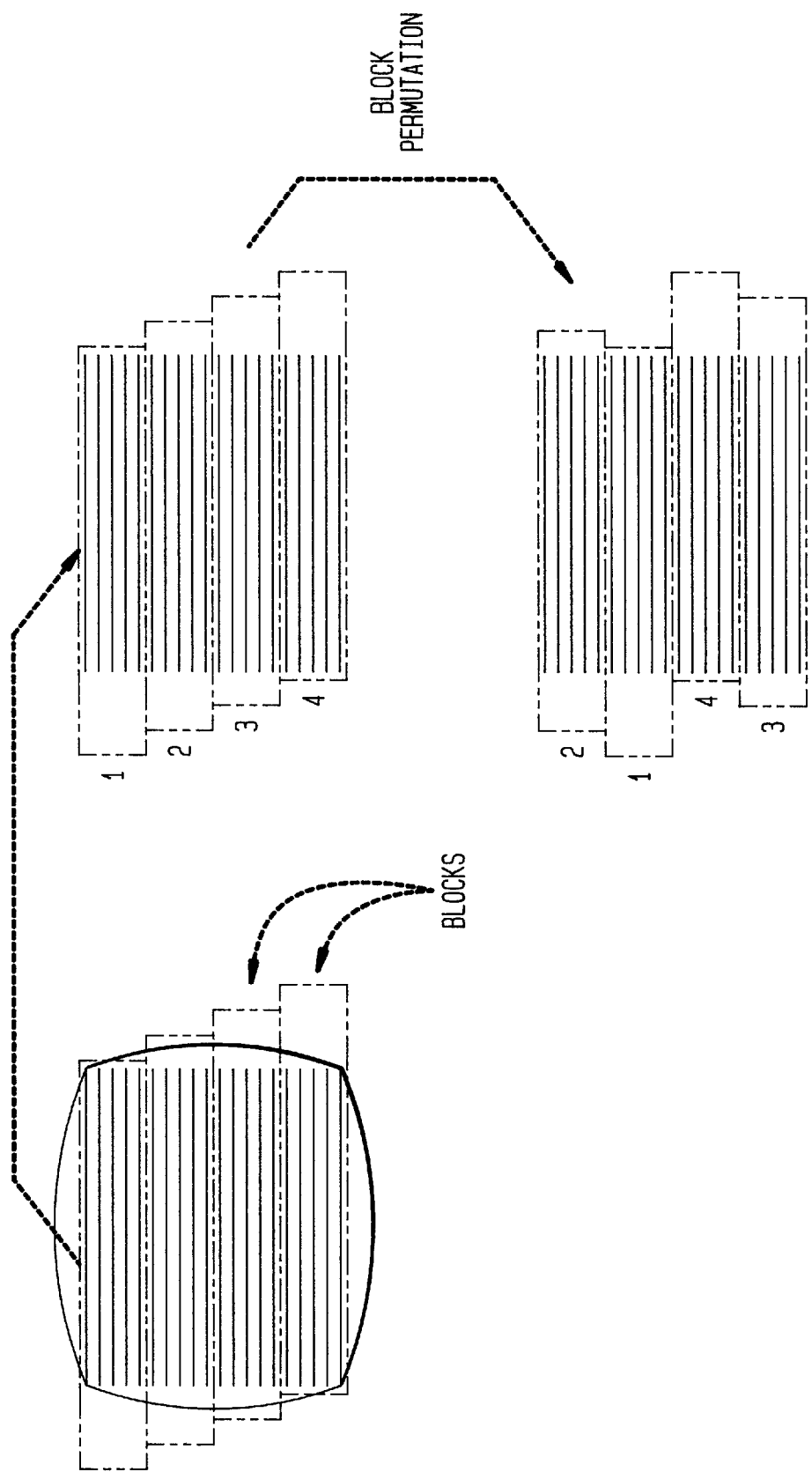
FIG. 4 illustrates permutation of blocks in a video signal.

Block permutation resembles line permutation. The lines are grouped into BLOCKs of five lines each, as shown in FIG. 4. The BLOCKs themselves are then permuted, as indicated.

In one embodiment, block permutation is not used.

Recapitulation

Figure 5:
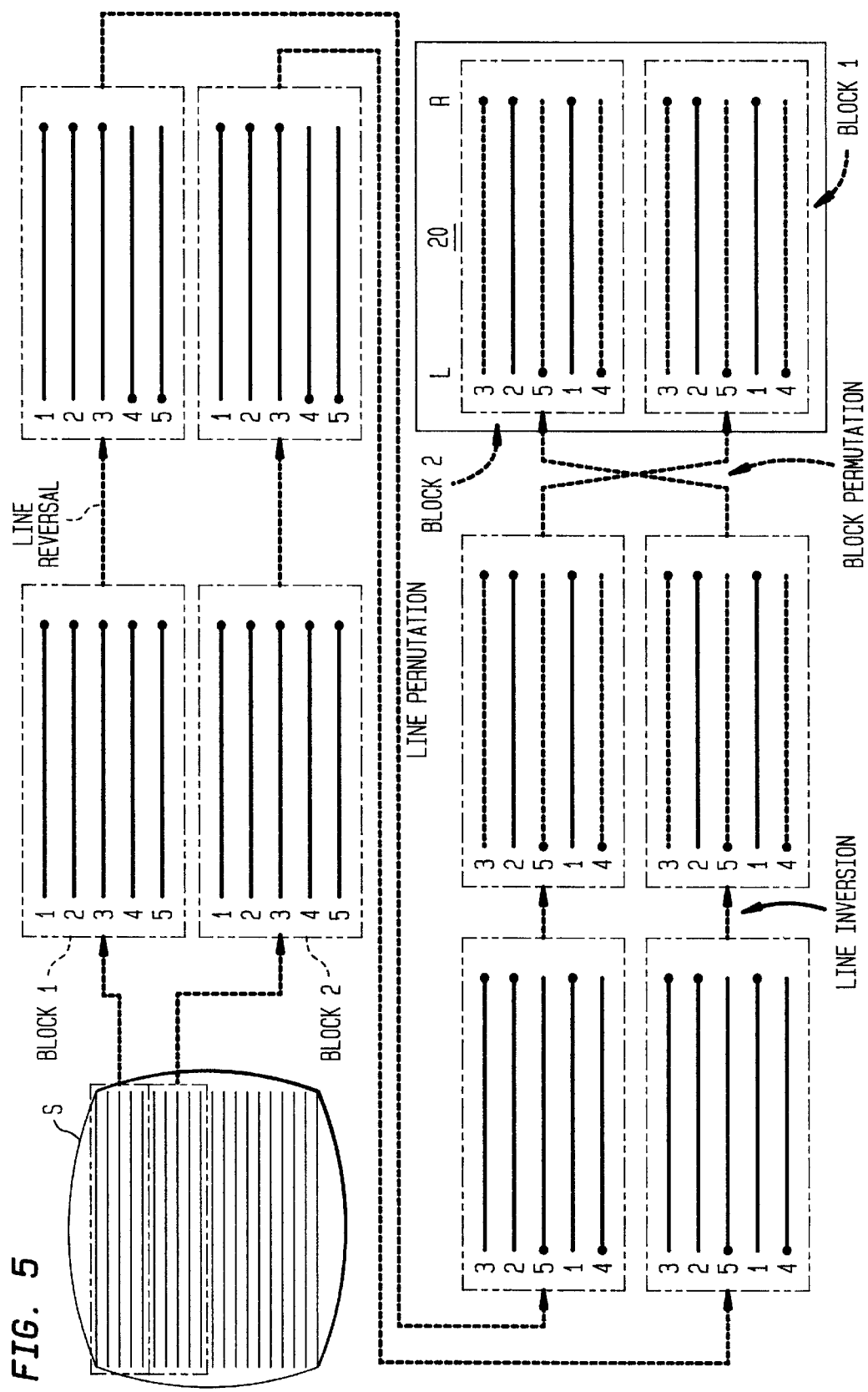
FIG. 5 illustrates a combination of line reversal, line permutation, line inversion, and block permutation.

The discussion so far can be summarized, from one perspective, by FIG. 5. Two BLOCKs, of five lines each, and labeled BLOCK 1 and BLOCK 2, are taken from the screen S. LINE REVERSAL is performed first (although need not be first). Then, in each BLOCK, LINE PERMUTATION is imposed. Next, in each block, LINE INVERSION is undertaken. Inverted lines are indicated by dashing. Then, BLOCK PERMUTATION is done. The two resulting BLOCKs within box 20 represent the scrambled signal which is to be transmitted.

The information within box 20 is transmitted as follows. The lines in BLOCK 2 are first transmitted, from top-to-bottom (that is, in the sequence 3, 2, 5, 1, 4), with each line being transmitted from left (L) to right (R). Next, BLOCK 2 is transmitted in the same way. As a result, a receiver of this signal receives a signal which is scrambled.

Reconstruction

Line Permutation Table

Figure 6:
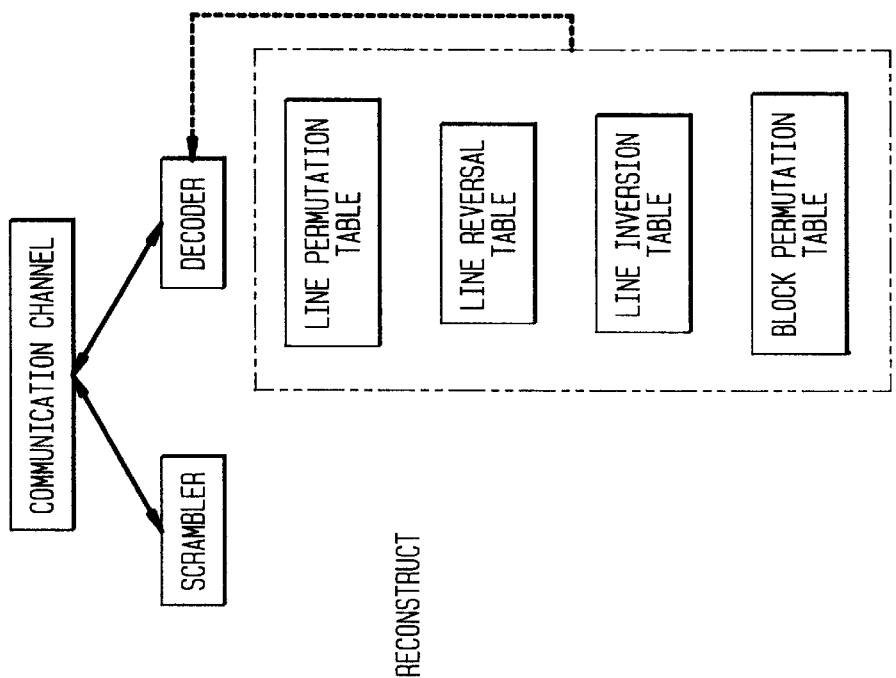
FIG. 6 illustrates a high-level architecture representing one form of the invention.

FIG. 6 illustrates a SCRAMBLER which performs the operations summarized in FIG. 5. The SCRAMBLER transmits the information along a COMMUNICATION CHANNEL, such as a cable television network, or satellite link, to a DECODER.

The DECODER is located at a receiver (not shown), such as a customer's home, and reconstructs the original image. The DECODER uses four TABLES, shown in the Figure, to reconstruct the image. These TABLEs are stored in memory to which the DECODER has access.

Figure 7:
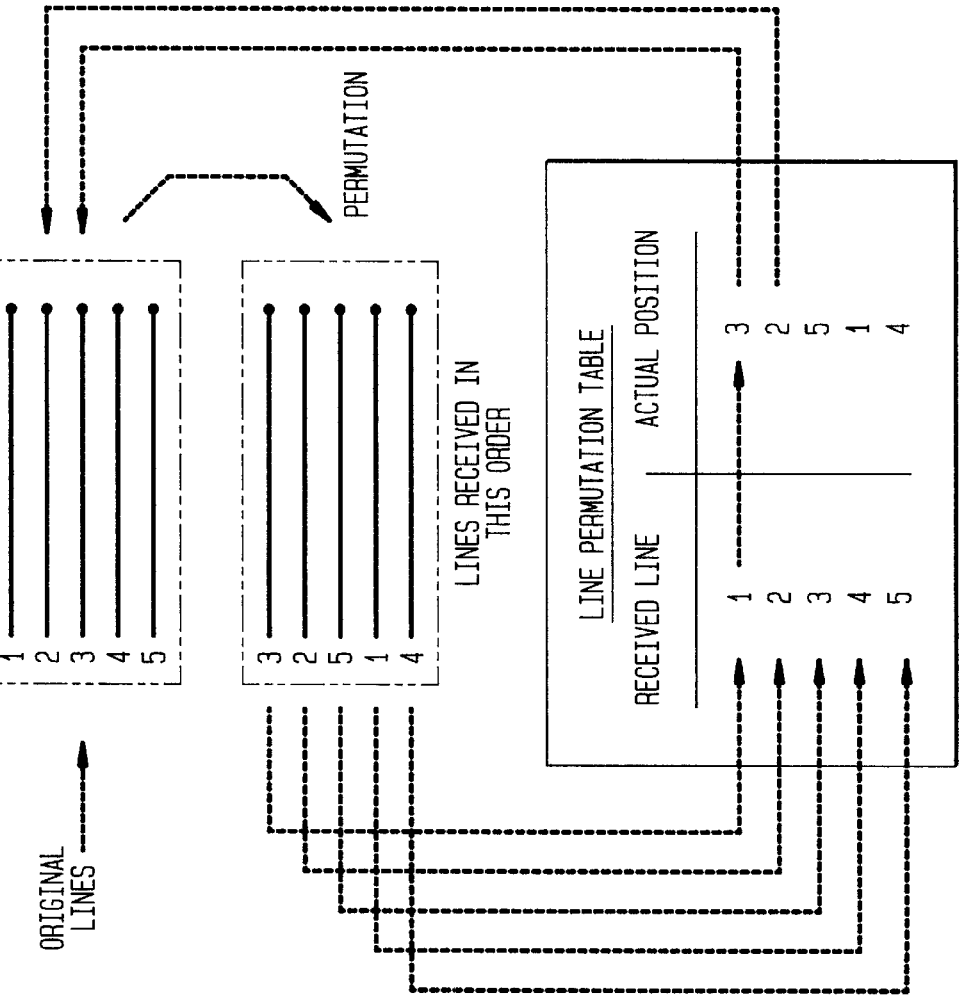
FIG. 7 illustrates reconstruction of a block of lines, using the LINE PERMUTATION TABLE.

The LINE PERMUTATION TABLE tells how to re-order the lines. For example, in FIG. 5, the lines of each BLOCK are received in the order 3, 2, 5, 1, 4. The LINE PERMUTATION TABLE in FIG. 7 allows the DECODER to determine that the first line received is actually the third line on the screen, the second line received is actually the second line on the screen, and so on.

The LINE PERMUTATION TABLE allows the lines of each block to be arranged in the proper order.

Other Tables

Figure 8:
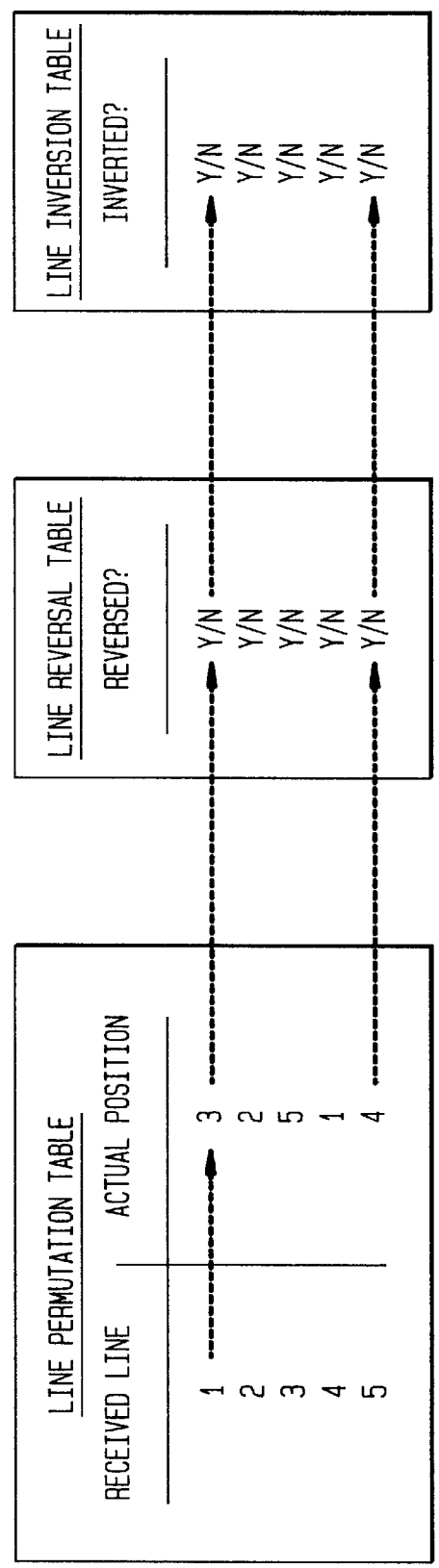
FIG. 8 illustrates use of three types of TABLEs by the invention.

The DECODER contains other Tables, as indicated in FIG. 6, and also in FIG. 8. In FIG. 8, the LINE REVERSAL TABLE indicates, for each line in a block, whether the line is reversed. A ZERO indicates no reversal ("N" in the Figure) while a ONE indicates reversal ("Y").

Similarly, a LINE INVERSION TABLE indicates, for each line in a block, whether the line is inverted or not. A ZERO indicates inversion, a ONE indicates inversion.

Each line of a block is processed as indicated by the arrows in FIG. 8. To repeat: the actual position of each line within the block (and thus on the screen) is ascertained from the LINE PERMUTATION TABLE. Whether the line must be reversed or inverted, or both, is ascertained from the LINE REVERSAL TABLE and the LINE INVERSION TABLE, respectively.

The BLOCK PERMUTATION TABLE (FIG. 6) indicates how the blocks should be ordered.

More Complex Form of Invention

The preceding discussion is a simplification, and has considered four modes of scrambling, namely, (1) line reversal, (2) line permutation, (3) line inversion, and (4) block permutation. It was assumed that each mode of scrambling was done according to a single type of TABLE shown in FIG. 6. For example, it was assumed that a single type of line permutation, and thus a single LINE PERMUTATION TABLE, was used, namely, the TABLE shown in FIG. 7.

In one form of the invention, the TABLE used for scrambling and de-scrambling each mode is changed during operation. Some examples will illustrate.

EXAMPLES

FIG. 9 illustrates four columns, running from left to right. The first column shows four different LINE PERMUTATION TABLES, labeled TABLE 1 through TABLE 4, which are contained within the DECODER of FIG. 6. The other columns show (a) four different LINE REVERSAL TABLES, (b) four different LINE INVERSION TABLES, and (c) four different BLOCK PERMUTATION TABLES. All are contained within the DECODER.

At any given time, a given combination of TABLEs, one from each column, is used. The invention changes the combination of TABLES as time progresses, to attain more effective scrambling, as will now be explained.

Figure 10:
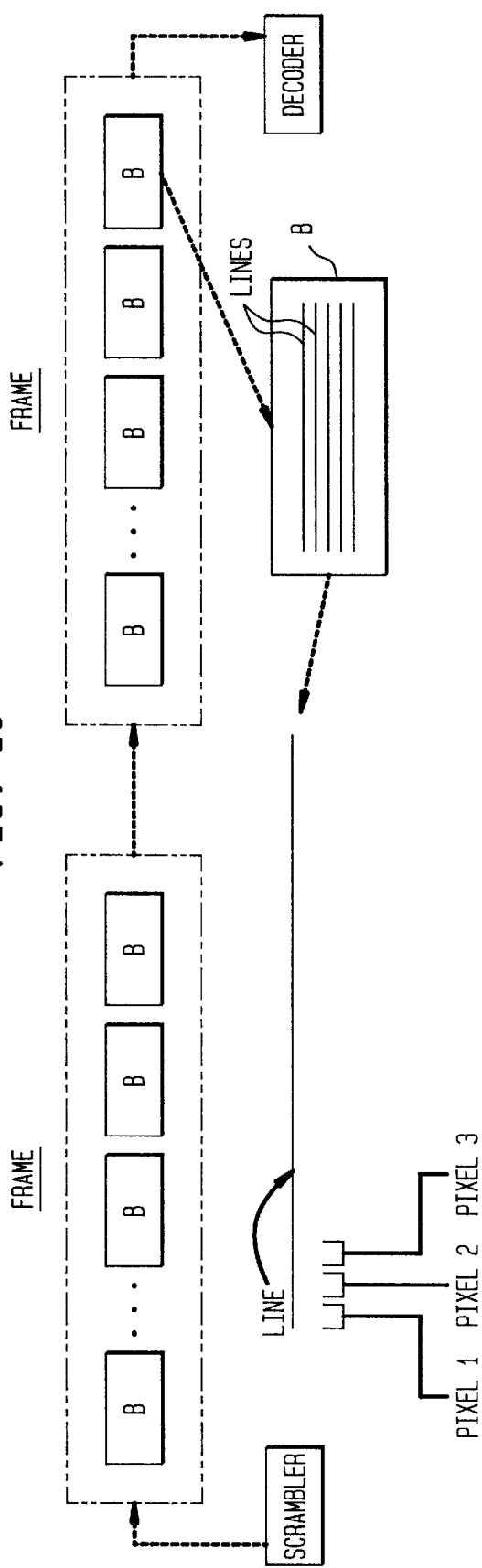
FIG. 10 illustrates the division of a video signal into FRAMEs, which contain LINEs, which are composed of PIXELs.

FIG. 10 illustrates the data transmitted by the SCRAMBLER to the DECODER. A sequence of blocks B is transmitted. The blocks B are grouped into FRAMEs, as indicated. (The FRAMEs may be subdivided into fields, not shown, which are interlaced. This subdivision does not change the principles of the invention.)

Each BLOCK B contains LINEs, as indicated. Each LINE, as indicated, contains digital data which represents the pixels contained within the line. The LINEs and BLOCKs are scrambled, according to the four modes discussed above.

Between FRAMEs, as shown in FIG. 11, the SCRAMBLER transmits codes which identify the TABLEs to be used for de-scrambling of subsequent frames. For example, the group of codes labeled 30 specify use of

LINE PERMUTATION TABLE (LPT) 1,

LINE REVERSAL TABLE (LRT) 2,

LINE INVERSION TABLE (LIT) 3, and

BLOCK PERMUTATION TABLE (BPT) 2.

Examples of such TABLEs are shown in FIG. 9. The group of codes 30 in FIG. 11 specifies the type of de-scrambling for all subsequent FRAMEs.

Later, another group of codes, such as group 33, can be transmitted, which specify another combination of TABLEs to use, for subsequent FRAMEs.

In general, the SCRAMBLER transmits codes at intervals (which need not be periodic, but can be) which specify the TABLES to use for de-scrambling of subsequent FRAMEs.

Replacement of Tables

FIG. 9 shows four BLOCK PERMUTATION TABLEs (BPT). However, the number of possible BPTs is much greater than four. Each frame, containing 525 lines, is generally divided into two fields, by interlacing. Each field contains about 112 lines. If each field is divided into blocks of five lines each, then 21 blocks will contain these 112 lines.

The number of possible permutations of 21 blocks, and thus the number of possible BPT TABLEs, equals 21-factorial, which equals about $5.1 \times 10^{}19$ (the symbols "" mean "raised to the power").

It is not feasible to store this large number of BPTs within the DECODER. As a secondary consideration, even if all TABLES were, in fact, stored, the digital code needed to select a particular table, from this large number of tables, would need at least 66 bits, in order to express the number $5.1 \times 10^{19}$. (The binary base 2, raised to the 66 power, equals $7.4 \times 10^{19}$, which is greater than $5.1 \times 10^{19}$, thus indicating that 66 bits are sufficient to express a number in the range from zero to 21-factorial.)

The other TABLES also contain large number of possibilities, but not so large as the BPT. Therefore, rather than store all possible tables within the DECODER, the invention transmits contents of the TABLEs at intervals, from the SCRAMBLER. FIG. 12 illustrates this concept.

Between FRAMEs, the group of data labeled 36 instructs the DECODER to replace the data in LPT 1 with data which is presently transmitted, and indicated by the phrase "(DATA)". Similarly, data in the other TABLES are replaced.

Therefore, as thus far described, several important features of the invention are the following.

1. Frames are divided into fields, which are divided into blocks of lines. Five lines per block are preferred.

2. The lines within a block are scrambled in four modes, namely, line permutation, line reversal, and line inversion.

3. The blocks themselves are scrambled, in block permutation, providing a fourth mode of scrambling.

4. The scrambling, which is done by an ENCODER, is done according to TABLEs.

5. De-scrambling, which is done at a DECODER, is done according to identical TABLES.

6. The particular TABLEs used for scrambling are changed during transmission. The DECODER is informed of the changes by messages transmitted between frames. The change in TABLEs applies to all subsequently received frames.

7. The contents of the TABLEs can be changed by the ENCODER. The ENCODER sends a message to the DECODER which specifies the TABLEs to be changed. The message includes data which is to replace the data previously contained within the specified TABLEs. After a change, the TABLEs can be specified as usual, by messages sent between frames.

Dynamic Change of Scrambling Modes

For present purposes, video images can be divided into two types: those containing little motion (such as a landscape), and those containing much motion (such as a basketball game). It has been found that images containing little motion do not scramble well using rudimentary scrambling techniques. Such techniques do not adequately disguise the image.

For example, line inversion alone does not scramble a low-motion image very well: the scrambled image will still be discernible. (On the other hand, line inversion is very effective in scrambling high-motion images.)

The invention addresses this problem by changing the total number of scrambling modes used at a given time, based on the amount of motion contained in the image. FIG. 5 illustrates four modes of scrambling: LINE INVERSION, LINE PERMUTATION, LINE REVERSAL, and BLOCK PERMUTATION.

The concept of amount of motion can be explained by an example. In a video image, consider a sample in the form of an 8×8 group of pixels, giving 64 pixels total. Assume that each pixel in the sample is represented by an eight-bit word, or byte. Assume also that a byte value of 255 represents full black luminance, and a byte value of 000 represents full white luminance.

If the number representing each of the 64 pixels remains constant, or changes very little, over time, then a still-type image is assumed to exist. A greater number of scrambling modes is called for.

On the other hand, if each pixel changes significantly over time, then a high-motion image is assumed, and a smaller number of scrambling modes is called for.

Some video transmitters detect the amount of motion contained within an image, quantify the amount of motion, and generate a signal which indicates the amount of motion detected. For example, IEEE standard H.261, IMPEG 2, concerns video conferencing. Under this standard, the transmitter of the video signal (such as a cable television station) includes motion vectors within the video signal. These motion vectors indicate the amount of motion contained within the image. Generation of the motion vectors is known in the art.

The invention responds to the motion vectors by altering the scrambling. When low-motion images are detected, a greater number of scrambling modes are used. As a specific example, every line is inverted, as in FIG. 3, and the lines are randomly permuted (FIG. 2 illustrates permutation). No other scrambling is done.

When high-motion images are detected, a smaller number of modes are used.

Specific Embodiment

One goal of scrambling is to distort the video image. Another goal is to make the scrambling code difficult to crack, as by changing the code periodically.

However, the inventor has observed that this periodic changing, if done too rapidly, performs a type of de-scrambling, and allows the underlying image to become discernible. For example, if the video image is presented at 30 frames per second, and if the type of scrambling is changed every few frames, then the change in scrambling itself tends to unscramble the image.

The inventor has derived the following general rule, for prevention of this unscrambling. In a video image presented at 30 frames per second, line inversion is used, as shown in FIG. 3. Line permutation is also used, as shown in FIG. 2. However, the line permutation sequence is changed every two or three seconds.

Suppression of Line Reversal in High-Noise Conditions

Sometimes, the channel carrying the video signal is contaminated by high electrical noise. During periods of such noise, decoding of line-reversed scrambling (line reversal is illustrated in FIG. 1) becomes difficult. To combat this problem, the invention monitors the channel for noise, and avoids scrambling in the line-reversal mode, when noise exceeds a threshold.

Figure 13:
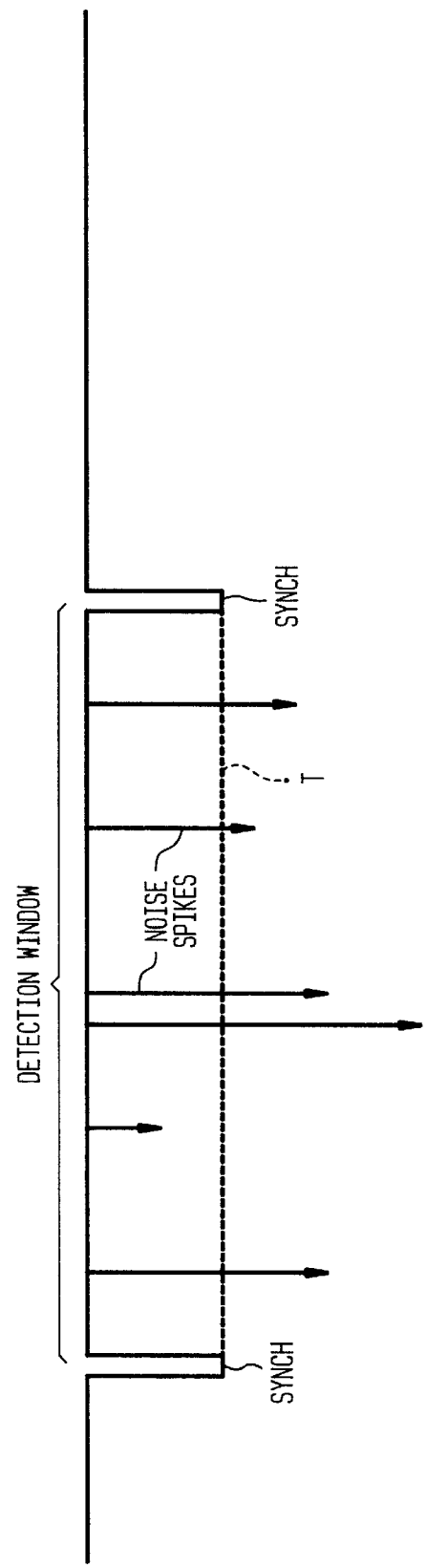
FIG. 13 illustrates detection of NOISE SPIKEs which occur between SYNCH PULSEs.

The invention infers noise from the presence of pulses which (a) exceed the synch pulses and (b) occur between actual synch pulses. FIG. 13 illustrates the detection of noise.

When a SYNCH PULSE is detected, the invention opens a DETECTION WINDOW, of suitable extent. For example, the DETECTION WINDOW can extend between adjacent SYNCH PULSES.

The invention then counts NOISE SPIKEs which are contained within the DETECTION WINDOW. These SPIKEs are defined as signals which exceed a threshold T, which preferably equals the SYNCH PULSE strength. If the number of NOISE SPIKEs counted exceeds a limit, during a prescribed time period, such as 60 frames (which, in this example, represents 60 DETECTION WINDOWS) , then excess noise is determined to be present.

When excess noise is present, the invention avoids performing line-reversal. Typically, a cable television operator, as opposed to the consumer, performs the test for excess noise. The operator informs the DECODER in FIG. 6, by an appropriate signal, when line reversal is being done. The DECODER responds by decoding line reversal, or not doing so, as appropriate.

Synchronization of Audio

The video signal and the audio signal undergo different types of processing within the DECODER. Further, the two signals are carried by different carriers, which follow different signal paths. Consequently, the video signal and the audio signal will not arrive at their respective destinations at the same time.

Restated, the finally processed video signal, ready for display on a television monitor, will not be synchronous with the finally processed audio signal, ready for broadcast by a speaker. A time difference will exist.

The invention determines this time difference, in order to synchronize the video with the audio. One approach to determining the time difference is to first generate two synchronous clocks, one in the SCRAMBLER, and one in the DECODER of FIG. 6. Then, the SCRAMBLER transmits a sample audio signal, and records the time of transmission. Assume this time to be T1.

Next, the DECODER receives the sample audio signal, and processes it, and records the time, T2, when processing has completed. The DECODER transmits the time T2 to the SCRAMBLER. The SCRAMBLER determines the time difference, T2–T1. Since the clocks which produced Ti and T2 are synchronous, the difference T2–T1 indicates the time difference between the video and audio signals.

A similar procedure can be used to ascertain the video delay time. Based on the two delay times (audio and video), the invention computes the time by which the earlier signal must be delayed, in order to synchronize it with the later-arriving signal.

Therefore, as to synchronization, the invention first ascertains the delay between the audio and video signal. One approach has been given above. Other approaches are known in the art.

Then, the invention buffers the earlier-arriving signal, or otherwise delays it, while awaiting arrival of the later signal. Then, the signals are delivered, in synchrony, to a receiver, such as a television set.

Numerous substitutions and modifications can be undertaken without departing from the true spirit and scope of the invention. What is desired to be secured by Letters Patent is the invention as defined in the following claims.

I claim:

1. In the transmission of a video signal, wherein a scrambler scrambles the video signal and a decoder de-scrambles the video signal, the improvement comprising the following steps:
   a) in the decoder,
      i) maintaining a plurality of tables, each for de-scrambling a respective type of scrambling, and
      ii) at different times, selecting and using a different table to de-scramble the video signal.

2. Improvement according to claim 1, wherein the scrambler specifies the table to be selected in Paragraph (a)(ii).

3. Improvement according to claim 1, and further comprising the step of changing content of the tables.

4. In the transmission of a video signal, the improvement comprising each of the following steps performed upon substantially all frames within the video signal:
   i) inverting video lines;
   ii) reversing video lines;
   iii) permuting sequences of video lines; and
   iv) permuting sequences of blocks of video lines.

5. In a system wherein a scrambler has available multiple modes of scrambling a video image, the improvement comprising the following steps:
   a) ascertaining amount of motion occurring in the video image; and
   b) changing scrambling modes used, in response to changes in the amount of motion.

6. Improvement according to claim 5, in which the change of scrambling modes includes the step of implementing line inversion when the amount of motion exceeds a threshold.

7. Improvement according to claim 5, in which the modes of scrambling include two or more of the following:
   (i) line permutation,
   (ii) line inversion,
   (iii) line reversal, and
   (iv) permutation of blocks of lines.

8. A method of scrambling a video signal, comprising the following steps:
   a) inverting video lines;
   b) permuting video lines according to a sequence; and
   c) occasionally changing said sequence.

9. Method according to claim 8, in which said sequence is changed about every two seconds.

10. A method of scrambling a video signal, which is sent along a transmission channel, comprising the following steps:
   a) performing line reversal;
   b) detecting noise on the transmission channel; and
   c) when detected noise exceeds a threshold, preventing line reversal.

* * * * *